United States Patent
Strolz et al.

(10) Patent No.: US 9,663,023 B2
(45) Date of Patent: May 30, 2017

(54) METHOD FOR AUTOMATICALLY ADAPTING VEHICLE LIGHTING TO A SURROUNDING AREA OF A VEHICLE, LIGHTING APPARATUS AND VEHICLE HAVING LIGHTING

(71) Applicant: Bayerische Motoren Werke Aktiengesellschaft, Munich (DE)

(72) Inventors: Michael Strolz, Munich (DE); Thomas Tille, Munich (DE); Stefan Weidhaas, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 262 days.

(21) Appl. No.: 14/524,034

(22) Filed: Oct. 27, 2014

(65) Prior Publication Data

US 2015/0127227 A1 May 7, 2015

Related U.S. Application Data

(63) Continuation of application No. PCT/EP2013/062915, filed on Jun. 20, 2013.

(30) Foreign Application Priority Data

Jun. 21, 2012 (DE) ......................... 10 2012 210 467

(51) Int. Cl.
*B60Q 1/08* (2006.01)
*G06K 9/00* (2006.01)
*G06K 9/46* (2006.01)

(52) U.S. Cl.
CPC .......... *B60Q 1/085* (2013.01); *G06K 9/00818* (2013.01); *B60Q 2300/45* (2013.01); *G06K 9/4661* (2013.01)

(58) Field of Classification Search
CPC .............. B60Q 1/085; B60Q 2300/45; G06K 9/00818; G06K 9/4661
See application file for complete search history.

(56) References Cited

U.S. PATENT DOCUMENTS 3,752,408 A * 8/1973 Tixier ................. F21S 48/1768
359/229
5,329,206 A * 7/1994 Slotkowski .......... B60Q 1/1423
315/159

(Continued)

FOREIGN PATENT DOCUMENTS

CN          101970262 A      2/2011
DE          198 52 631 A1    5/2000

(Continued)

OTHER PUBLICATIONS

English Translation of foreign EP2127944A, (Translation of Description and claims), pub. date Dec. 2, 2009.*

(Continued)

*Primary Examiner* — Mussa A Shaawat
(74) *Attorney, Agent, or Firm* — Crowell & Moring LLP (57) ABSTRACT

A method for automatically adapting vehicle lighting to the surrounding area of the vehicle is provided. According to the method, an image of an illuminated surrounding area of the vehicle is acquired. It is determined whether a road sign is present in the surrounding area of the vehicle. Once the position of the road sign has been determined, a light emitted by the lighting device of the vehicle is changed in the direction of the determined position of the road sign so as to reduce the reflection of the emitted light from the road sign.

12 Claims, 8 Drawing Sheets

(56) References Cited

U.S. PATENT DOCUMENTS

| | | | |
|---|---|---|---|
| 6,553,296 B2* | 4/2003 | Breed | B60R 25/25 |
| | | | 180/271 |
| 6,772,057 B2* | 8/2004 | Breed | G06K 9/00832 |
| | | | 180/271 |
| 6,801,638 B1 | 10/2004 | Janssen et al. | |
| 9,013,058 B2 | 4/2015 | Watanabe | |
| 2010/0026806 A1 | 2/2010 | Heinrich et al. | |
| 2011/0012510 A1* | 1/2011 | Tani | B60Q 1/1423 |
| | | | 315/82 |
| 2012/0081544 A1* | 4/2012 | Wee | G01S 17/023 |
| | | | 348/140 |
| 2013/0314503 A1* | 11/2013 | Nix | G06K 9/00805 |
| | | | 348/46 |
| 2014/0071702 A1 | 3/2014 | Faber et al. | |

FOREIGN PATENT DOCUMENTS

| | | |
|---|---|---|
| DE | 10 2006 055 904 A1 | 5/2008 |
| DE | 10 2007 048 717 A1 | 4/2009 |
| DE | 10 2008 025 947 A1 | 12/2009 |
| DE | 10 2010 015 731 A1 | 10/2011 |
| DE | 10 2011 004 937 A1 | 9/2012 |
| EP | 1 506 893 A2 | 2/2005 |
| EP | 2 127 944 A1 | 12/2009 |
| EP | 2 275 305 A1 | 1/2011 |
| WO | WO 2009/112910 A1 | 9/2009 |

OTHER PUBLICATIONS

Chinese Office Action issued in Chinese counterpart application No. 201380024806.8 dated Dec. 4, 2015, with English translation (Seventeen (17) pages).

International Search Report (PCT/ISA/210) dated Oct. 4, 2013, with English translation (six (6) pages).

German Search Report dated Jan. 25, 2013, with English translation (ten (10) pages).

* cited by examiner

METHOD FOR AUTOMATICALLY ADAPTING VEHICLE LIGHTING TO A SURROUNDING AREA OF A VEHICLE, LIGHTING APPARATUS AND VEHICLE HAVING LIGHTING

CROSS REFERENCE TO RELATED APPLICATIONS

This application is a continuation of PCT International Application No. PCT/EP2013/062915, filed Jun. 20, 2013, which claims priority under 35 U.S.C. §119 from German Patent Application No. 10 2012 210 467.4, filed Jun. 21, 2012, the entire disclosures of which are herein expressly incorporated by reference.

BACKGROUND AND SUMMARY OF THE INVENTION

The invention relates to a method for automatically adapting vehicle lighting to a surrounding area of a vehicle, particularly when road signs are present in the surroundings of the vehicle, as well as to a lighting apparatus for a vehicle that is suitable for illuminating road signs.

During night driving, a lighting apparatus of a vehicle is particularly important for a driver with respect to safety and driving comfort. High-beam assistance systems (FLA) already permit a selective and adaptive illumination of the road. However, the previously known high-beam assistance systems offer no functionality for protecting a driver from an unpleasant and dangerous blinding as a result of a strong reflection of light from road signs. Particularly during night driving with high-beam headlights, a reflection of the vehicle's own light from road signs may result in severe blinding and thereby in a high-risk impeding of the driver's view.

In the case of blinding as a result of the reflection of the vehicle's own light from road signs, a driver currently can only reduce or limit the blinding by way of manual changes of the light, for example, by switching to low-beam light. High-beam assistance systems known so far offer no functionality for relieving the driver from this operating step. Instead, high-beam assistance systems provide information as to whether, for example, an oncoming vehicle or a vehicle driving ahead is present in the surroundings of the own vehicle or whether the own vehicle is situated in an illuminated town. This information provided by a high-beam assistance system permits only an automated deactivating of the high-beam light for scenarios with oncoming vehicles or vehicles driving ahead or in illuminated towns.

The blinding of a driver by the reflection of light at road signs is not only perceived to be annoying by the driver. Glare also represents an increased danger potential during night driving when the accident potential already is particularly high because of limited visibility, crossing deer or slipperiness. A driver's blinding by high-beam reflection at a road sign may lead to a late or wrong reaction in dangerous situations. A manual switching-over from high-beam to low-beam light is time-consuming, which has the effect that the blinding will in fact last longer. On the other hand, an excessive prolonged deactivating of the high-beam also leads to an increased risk because the illumination of the road will no longer be optimal during that time period.

It is desirable to provide a method for automatically adapting vehicle lighting to a surrounding area of the vehicle by which reflections of the own vehicle's light at road signs can be avoided or at least largely reduced. Furthermore, there is the need to provide a lighting apparatus for a vehicle which makes it possible to avoid or at least largely reduce the reflection of the own vehicle's light at road signs.

An embodiment of a method for controlling vehicle lighting includes the following steps:

lighting the surroundings of the vehicle by way of a lighting device of the vehicle, acquiring an image of the surroundings of vehicle, determining whether a road sign is present in the surroundings of the vehicle, detecting a position of the road sign in the surroundings of the vehicle by analyzing the image if it is determined that the road sign is present in the surroundings of the vehicle, and changing a light, which is emitted by the lighting device of the vehicle, in the direction of the detected position of the road sign in the surroundings of the vehicle such that a reflection of the emitted light at the road sign is reduced if it has been determined that a road sign is present in the surroundings of the vehicle.

According to the suggested method, when driving in the dark, if a considerable reflection of the light of the own vehicle is occurring at the road signs, the lighting is adapted in an automated manner by way of a high-beam assistance such that the reflection is reduced and the driver is therefore no longer significantly blinded. This leads to a higher driving comfort and to higher safety. An increased blinding of a driver, which is a result of the fact that road signs with a very high reflectance guide light from the headlight back to the driver's eye, can be reduced by way of a targeted, possibly partial reduction of the headlight brightness.

According to a conceivable embodiment, an image of the illuminated surroundings of the vehicle can be acquired for this purpose. In the acquired image, dominant radiation sources can be located and can be classified with respect to reflection. Besides or in addition, a road sign detection can be utilized. Such a road sign detection may, for example, be provided by currently already customary camera-based driving assistance systems. Such camera-based driving assistance systems, as a rule, simultaneously have several functionalities. In addition to a light detection for the automatic activation/deactivation of the high-beam light and the adaptive control of the light distribution, a detection of road signs is often also present. This road sign detection is used, for example, for indicating the currently valid speed limit to the driver.

By way of such a road sign detection, for example, the following features can be detected: class of sign, size of sign, reflectance, type of sign and the position of the sign relative to a vehicle coordinate system. The type of the sign and the position of the sign relative to the coordinate system of the vehicle can be recognized, for example, by a camera installed in the vehicle. By way of a brightness value in the image, the reflectance can also be determined when the brightness of the surroundings and the brightness of the headlights of the vehicle are known. By way of this information, the vehicle headlight can be activated in a targeted manner such that the brightness of the lighting of the own vehicle is reduced in a targeted manner precisely in the position in which the road sign is situated in the scene of the surroundings.

The lighting device of the vehicle, such as the vehicle headlight, can be activated such that the full brightness of the headlight is maintained in the remaining surroundings and on the road, so that the driver's view will not be impeded. Instead, a road sign standing at the edge of the road will now only be illuminated with a low light intensity of the headlight. The light emitted by the lighting device in the direction of the road sign is therefore changed in a targeted manner or is reduced in its brightness. The road sign therefore no longer appears so bright to the driver and a glare from the road sign is clearly reduced, whereas the remaining scene continues to be illuminated at full light intensity.

A corresponding embodiment of a lighting apparatus for a vehicle includes a lighting device for emitting light for the lighting of an area surrounding the vehicle, an acquisition device for acquiring an image of the surroundings of the vehicle, an analyzing device for determining whether a road sign is present in the surroundings of the vehicle, and a control device for controlling the lighting device of the vehicle. The analyzing device is configured to determine a position of the road sign in the surroundings of the vehicle by analyzing the image. The control device is configured to control the lighting device such that light emitted by the lighting device in the direction of the road sign is changed, whereby a reflection of the emitted light at the road sign is reduced.

By way of such a method and lighting apparatus, the driving comfort can be increased during night and evening driving. Furthermore, driving safety is increased and the accident risk is reduced because the lighting apparatus switches faster and more effectively than a person. In particular, the lighting is switched back more rapidly to full brightness, and thereby an optimal utilization of the high-beam takes place. In combination with a corresponding headlight system, for example, a matrix headlight, the manufacturing costs of the lighting apparatus are comparatively low and there is no significant weight increase.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
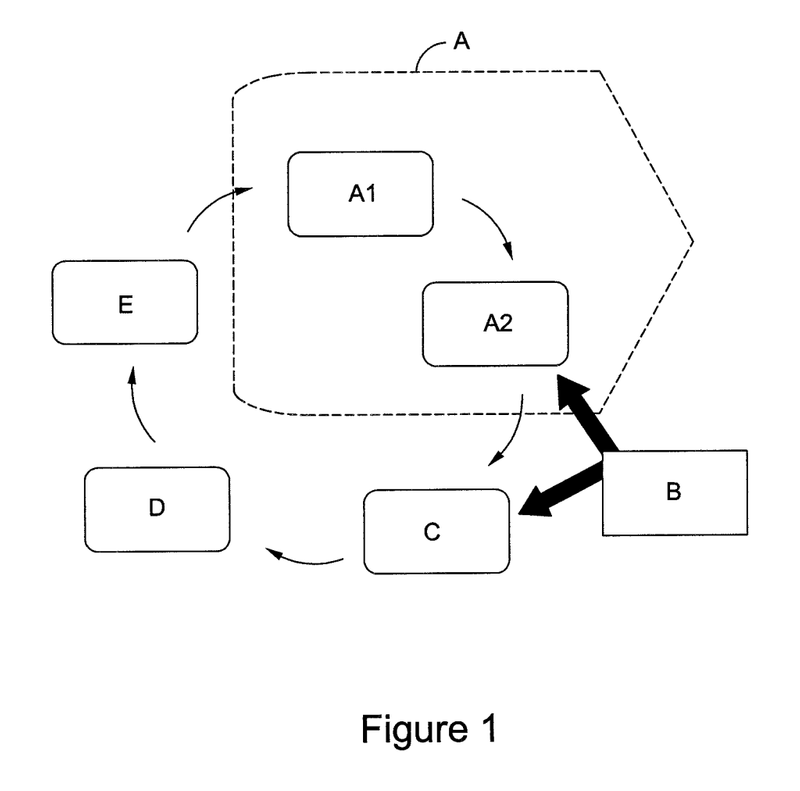
FIG. 1 is a view of a signal flow chart of an implementation possibility of a reflection-reducing high-beam assistant.

FIG. 1 illustrates an implementation possibility of a method for automatically adapting vehicle lighting to a surrounding area of a vehicle, which can be implemented, for example, by way of a reflection-reducing high-beam assistant.

In a Process Step A, for example, the currently prevailing light situation in the driver's visual range can be detected and analyzed. Process Step A includes the partial Steps A1 and A2. In the partial Step A1, the detection of the lighting situation takes place. For this purpose, an image can be acquired in the driver's visual range, for example, by way of a camera or a sensor. In partial Step A2, the analysis of the lighting situation in the acquired image takes place with respect to the reflections present in the image.

Instead of or in addition to the Process Step A, a Process Step B can be carried out in which information is provided concerning the location and type of road signs in the illuminated area of the vehicle surroundings, and can be used for the further course of the process. The information concerning the location and the type of road signs in the driver's current visual range can be provided by different information sources. Off-line map material can, for example, be used, such as digital maps, Internet databanks (Google® etc.) or a traffic sign detection already present in the vehicle.

After, either by the detection and analysis of the lighting situation (Process Step A) or by using already existing information concerning the location and type of traffic signs (Process Step B), the position and type of road signs in the illuminated headlight range of the vehicle have been determined, an improved illumination of the scene will be determined in a Process Step C. The illumination is optimized such that reflections at road signs are reduced in a targeted manner. For this purpose, the light emission of the lighting device of the vehicle in the direction of a road sign has to be changed.

This can take place, for example, in that, in the case of a light-emitting diode (LED) headlight, individual LEDs, which radiate light onto the road sign, are reduced in their brightness. In a Process Step D, a calculation of corresponding control signals takes place for controlling a headlight system. By appropriately activating the headlight system, in a Process Step E, the emission of light onto the road sign can be influenced in a targeted manner, so that reflections on road signs are suppressed or at least clearly reduced.

The headlight adjustment may be implemented as a control or as an adaptive automatic control. In the case of an automatic headlight control, the above-mentioned Process Steps are repeated after the first adjusting of the headlights and the headlights are thereby possibly readjusted.

Figure 2A:
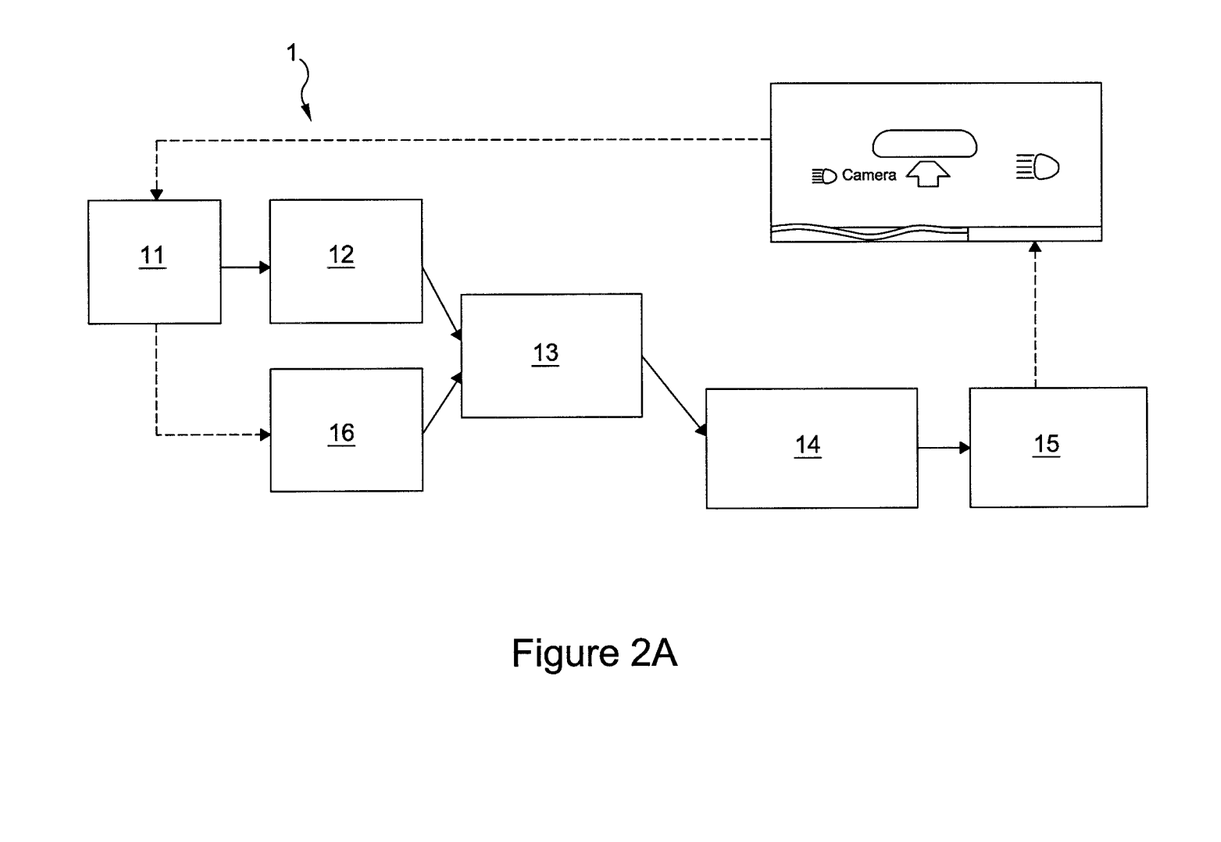
FIG. 2A is a view of a first embodiment of a method for automatically adapting vehicle lighting to a surrounding area of the vehicle.
Figure 2B:
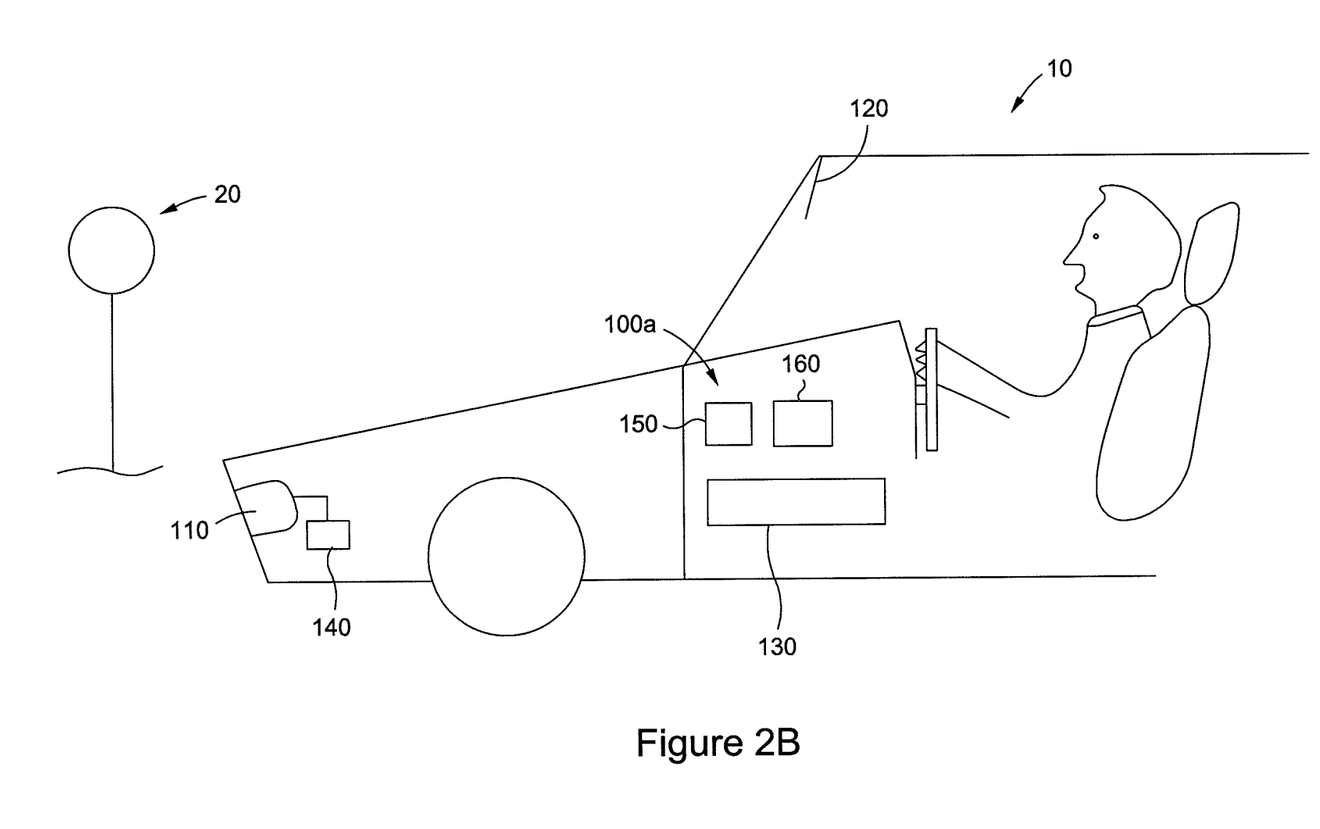
FIG. 2B is a view of a first embodiment of a lighting apparatus for a vehicle for adapting vehicle lighting to a surrounding area of the vehicle.

FIG. 2A illustrates a first embodiment 1 of a method for automatically adapting vehicle lighting to an area surrounding the vehicle. This is an automatic illumination control without any explicit road sign information. FIG. 2B illustrates a vehicle 10 in an area having a road sign 20. The vehicle includes an embodiment 100a of a lighting apparatus for the implementation of the method.

The lighting apparatus 100a includes a lighting device 110 for emitting light for lighting an area surrounding the vehicle 10. The lighting device 110 may, for example, be constructed as a headlight for lighting a scene in the front area of the vehicle 10. According to the course of the process illustrated in FIG. 2A, an image 30 of the scene of the surroundings of the vehicle is first determined in a Process Step 11. For this purpose, the lighting apparatus 100a has an acquisition device 120 for acquiring an image of the vehicle surroundings. The acquisition device 120 may, for example, be constructed as a sensor and/or a camera.

In a Process Step 12, dominant radiation sources are located in the image 30. The dominant radiation sources are located at those points in the image 30 at which the respective light intensity of the radiation sources is higher than at other points in the image. The lighting apparatus includes a light intensity determination device 150 for determining light intensities in the image 30. Furthermore, an analyzing device 130 is provided which is constructed for locating dominant radiation sources at points in the image if the respective light intensities are higher there than at other points in the image 30.

In a Process Step 13, the dominant radiation sources located in the image 30 are classified with respect to the reflection of the light emitted by the lighting device 110. The classification takes place as a function of the respective light intensity of the radiation sources in the acquired image, so that dominant radiation sources can be identified which originate from more or less reflecting objects in the surroundings of the vehicle. The analyzing device 130 is constructed for classifying the dominant radiation sources located in the image 30 with respect to a reflection of the light emitted by the lighting device 110. By way of the classification, it can be determined by the analyzing device 130 whether the dominant radiation source originates from the reflection of the own light on a road sign and therefore whether a road sign is present in the surroundings of the vehicle. By analyzing the acquired image, the analyzing device can also determine the position of a road sign 20 in the surroundings of the vehicle.

According to a conceivable embodiment, the analyzing device can determine areas in the acquired image on which lighting phenomena are present which originate from a reflection and/or whose brightness is above a defined light intensity value or gray-scale value. According to a further conceivable embodiment, the analyzing device can recognize the shape of the signs and/or the type of the signs and/or the reflectance of the signs in the acquired image by way of image processing.

The lighting apparatus 100a may optionally have a high-beam assistance system 160. The high-beam assistance system 160 may provide, for example, information with respect to an oncoming illuminated vehicle or an illuminated vehicle driving ahead. The information of the high-beam assistance system 160 can optionally be analyzed in a Process Step 16 and can be taken into account during the classification of the radiation sources in Process Step 13. The analyzing device 130 can be designed for classifying the dominant radiation sources, which are located in the image 30, as a function of the information provided by the high-beam assistance system 160.

When the presence of a road sign and its position in the acquired image has been determined by the analyzing device 130, it can be determined in a Process Step 14 how the light emitted by the lighting device 110 is to be changed. The changing of the light takes place particularly by reducing or dimming the brightness of the light. The light emitted by the lighting device 110 is changed in such a manner that a reflection of the emitted light at the road sign 20 is changed in the driver's visual range. In Process Step 14, particularly the illumination areas of the lighting device 110 are determined that are to be dimmed, so that the light emitted by the lighting device 110 onto the road sign is reduced in its brightness, whereas the remaining areas of the surroundings of the vehicle continue to be illuminated at high light intensity by the lighting device. The activating of the headlight system by way of corresponding control signals takes place by a control device 140 in Process Step 15.

Figure 3A:
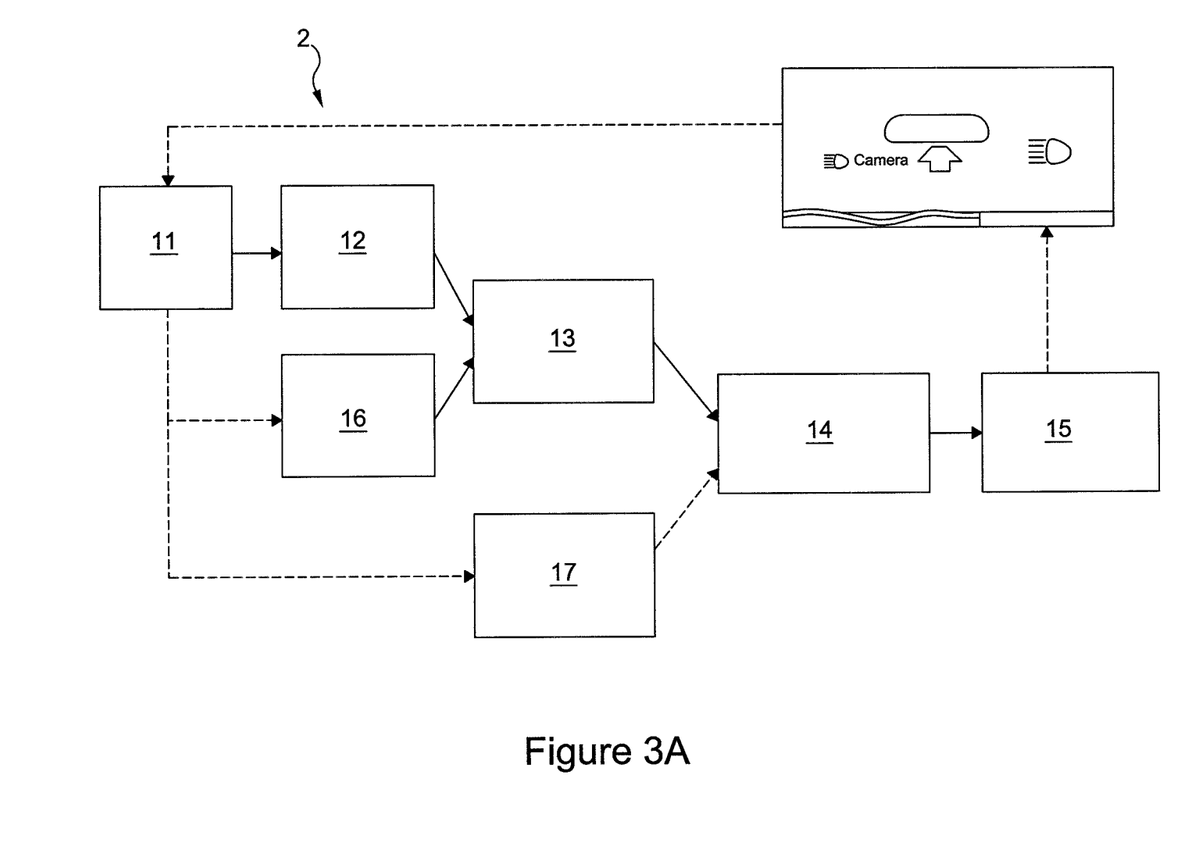
FIG. 3A is a view of a second embodiment of a method for automatically adapting vehicle lighting to a surrounding area of the vehicle.
Figure 3B:
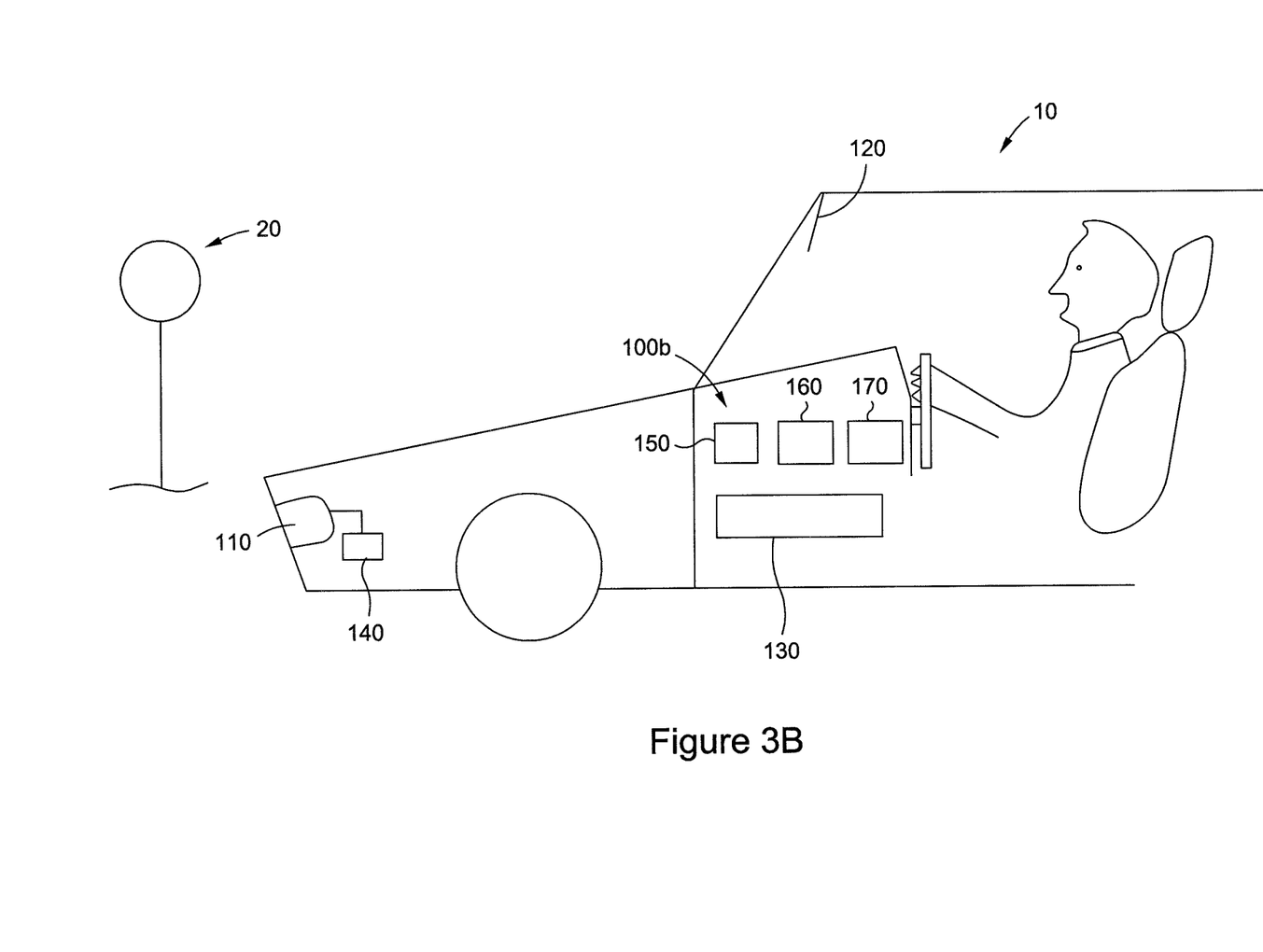
FIG. 3B is a view of a second embodiment of a lighting apparatus for a vehicle for adapting vehicle lighting to a surrounding area of the vehicle.

FIG. 3A illustrates a second embodiment 2 of a method for automatically adapting vehicle lighting to an area surrounding the vehicle for reducing light reflections on road signs. FIG. 3B illustrates a pertaining embodiment 100b of a lighting apparatus for a vehicle. While the automatic illumination control illustrated in FIG. 2A takes place without any explicit road sign information, FIG. 3A illustrates an automatic illumination control on the basis of explicit road sign information. In FIGS. 2A, 2B and 3A, 3B, corresponding Process Steps or devices of the lighting apparatus are provided with the same reference numbers. In the following, only the differences are discussed with respect to the method illustrated in FIG. 2A and the embodiment of the lighting apparatus illustrated in FIG. 2B.

In the embodiment 2 of the method for automatically adapting vehicle lighting to an area surrounding the vehicle, for determining the illumination areas to be dimmed (Process Step 14), in addition to the information from the classification of the radiation sources with respect to the reflection (Process Step 13), road sign information is now provided in an additional Process Step 17 for a traffic sign present in the acquired scene. The road sign information includes, for example, information concerning the presence of a road sign and/or the position and/or the class of the road sign and/or the size of the road sign and/or the reflectance of the road sign. The road sign information may be provided, for example, from map material, such as a digital map, from databanks (Internet databanks, Google®, etc.) or by a camera-based road sign detection.

In the case of a camera-based road sign detection, the lighting apparatus 100b, as illustrated by way of FIG. 3B, may have a road sign detection device 170 for providing the road sign information. Such road sign detection can take place, for example, by a camera-based detection. For this purpose, camera-based driving assistance systems can be used.

By way of the road sign detection system 170, it can be determined whether a road sign is present in the illuminated surroundings of the vehicle. Further road sign information, such as information concerning the position of the road sign and/or the class of the road sign and/or the reflectance of the road sign can be provided by the road sign detection device 170. By way of the classification of the dominant radiation sources with respect to reflection and by way of the road sign information, the illumination areas of the lighting device 110 to be reduced in their brightness or to be dimmed can be determined in Process Step 14, so that reflections of the own light from a road sign can be avoided or at least reduced.

Figure 4A:
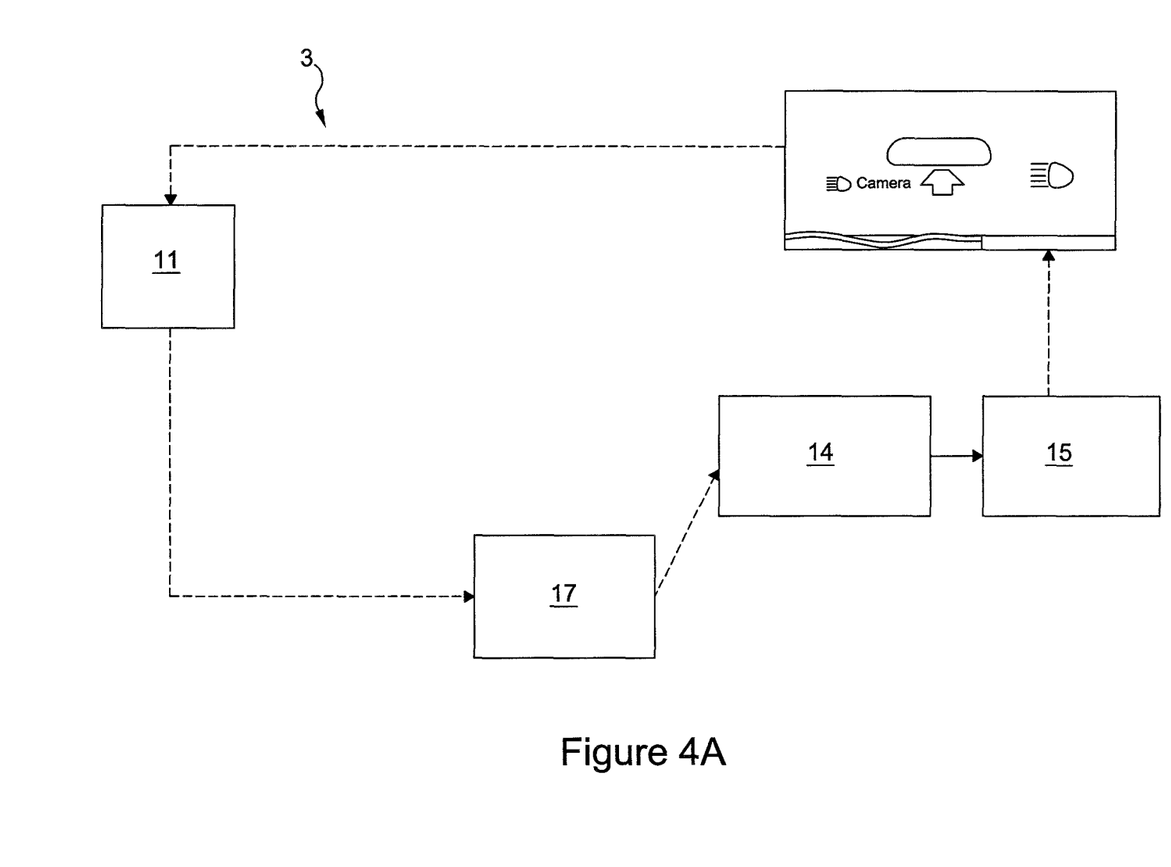
FIG. 4A is a view of a third embodiment of a method for automatically adapting vehicle lighting to a surrounding area of the vehicle.
Figure 4B:
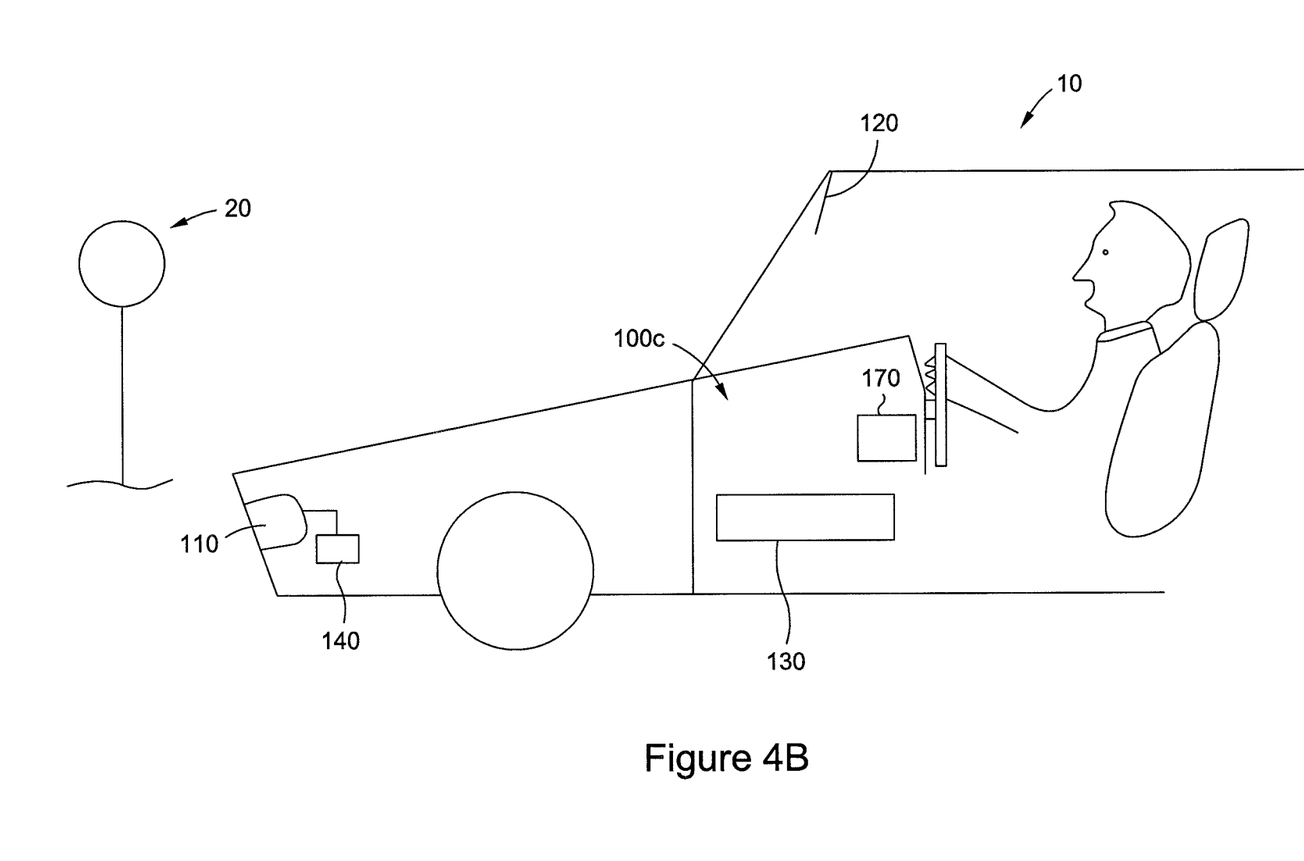
FIG. 4B is a view of a third embodiment of a lighting apparatus for a vehicle for adapting vehicle lighting to a surrounding area of the vehicle.

FIG. 4A illustrates an embodiment of a method 3 for automatically adapting vehicle lighting to a surrounding area of the vehicle. FIG. 4B illustrates the pertaining embodiment of a lighting apparatus for a vehicle. In contrast to the automatic controls illustrated in FIGS. 2A and 3A, FIG. 4A shows an illumination control on the basis of explicit road sign information.

In a Process Step 11, an image 30 of the scene of the surroundings of the vehicle is acquired by a sensor and/or a camera. In contrast to the methods illustrated in FIGS. 2A and 3A, no locating of dominant radiation sources and also no analysis of reflection phenomena takes place in the acquired image. Instead only the Process Step 17 already present in method 2 takes place, in which road sign information, particularly information concerning the presence of a road sign as well as the position and/or the class of the road sign and/or the size of the road sign and/or the reflectance of the road sign are provided. The road sign information can be determined, for example, by a camera-based road sign detection or from existing map material or from databanks.

In a subsequent Process Step 13, the road sign information can be used for determining the illumination areas of the lighting device 110 to be changed, particularly to be dimmed. The control device 130 controls the lighting device 110 as a function of the road sign information such that the emitted light and particularly the brightness of the emitted light in the determined position of the road sign is changed, so that, in a targeted manner, reflections at the road sign are avoided or largely reduced.

Figure 5:
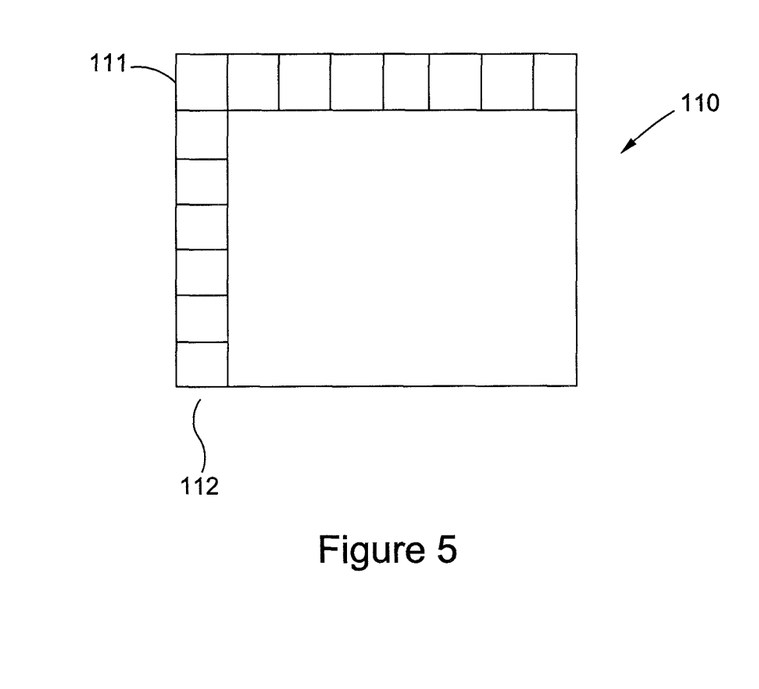
FIG. 5 is a view of an embodiment of a lighting device for a vehicle.

When the analyzing device 130 has determined that a road sign is present in the area surrounding the vehicle, the control device 140 will generate control signals for changing the light to be emitted by the lighting device 110 onto the road sign, so that a reflection of the emitted light on the road sign is avoided or at least reduced. The lighting device 110 may, for example, be designed as a headlight, particularly as an LED headlight. Such a headlight, where the individual LEDs are arranged in a matrix shape in lines 111 and columns 112, is illustrated in FIG. 5.

After it has been determined which LEDs in the line/column array are to radiate light of a low light intensity or brightness in order to reduce reflections of own light on the road sign 20, the control device 140 will activate the lighting device 110 by way of corresponding control signals. The activating of the individual LEDs can take place in a selective manner.

A reduction of the brightness takes place only when the brightness of the emitted light is above a threshold value. As a result, it is ensured that the illumination always remains at a sufficiently high level, so that road signs present in the scene continue to be illuminated at least with low intensity. As a result, it is ensured that the lighting apparatus operates while meeting legal and safety requirements.

LIST OF REFERENCE NUMBERS

10 Vehicle
20 Road sign
30 Acquired image
100a, 100b, 100c Embodiments of a lighting apparatus
110 Lighting device
120 Acquisition device
130 Analyzing device
140 Control device
150 Light intensity determination device
160 High-beam assistance system
170 Road sign detection device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically adapting vehicle lighting to an area surrounding a vehicle, the method comprising:
    lighting surroundings of the vehicle via a lighting device of the vehicle,
    acquiring an image of the surroundings of vehicle,
    determining whether a road sign is present in the surroundings of the vehicle,
    if it is determined that the road sign is present in the surroundings of the vehicle, detecting a position of the road sign in the surroundings of the vehicle by analyzing the image,
    if it is determined that the road sign is present in the surroundings of the vehicle, changing a light emitted by the lighting device of the vehicle in a direction of the detected position of the road sign, such that a reflection of the emitted light at the road sign is reduced,
    determining light intensities in the image
    locating dominant radiation sources at points in the image when respective light intensities of radiation sources at the points are higher than at other points in the image, and
    classifying the dominant radiation sources located in the image with respect to the reflection of the emitted light based at least in part on information received from a high-beam assistance system relating to oncoming vehicles.

2. The method according to claim 1, further comprising implementing a road sign detection in order to determine whether the road sign is present in the surroundings of the vehicle.

3. The method according to claim 2, further comprising:
    providing road sign information with respect to the road sign if it is determined that the road sign is present in the surroundings of the vehicle,
    wherein the road sign information comprises information relative to at least one of the position, a class, a size, or a reflectance of the road sign.

4. The method according to claim 3, wherein the changing of the light emitted by the lighting device takes place as a function of at least one of the classification of the radiation sources, the road sign detection, or the road sign information.

5. The method according to claim 1, further comprising:
    detecting a light intensity at a point of the road sign located in the image, and
    changing the light emitted by the lighting device until the light intensity at the point of the road sign located in the image falls below a threshold value.

6. The method according to claim 1, further comprising:
    detecting an area of the lighting device in which the emitted light is to be changed in order to reduce the reflection of the emitted light at the road sign, and
    changing the emitted light in the detected area of the lighting device.

7. The method according to claim 1, further comprising reducing a brightness of the emitted light such that an intensity of the emitted light is below a threshold value.

8. A lighting apparatus for a vehicle, the lighting apparatus comprising:
    a lighting device for emitting light for illuminating surroundings of the vehicle,
    an acquisition device for acquiring an image of the surroundings of the vehicle,
    an analyzing device for determining whether a road sign is present in the surroundings of the vehicle, wherein the analyzing device is configured to detect a position of the road sign in the surroundings of the vehicle by analyzing the image,
    a control device for controlling the lighting device of the vehicle, wherein the control device is configured to control the lighting device such that light emitted by the lighting device in a direction of the detected position of the road sign is changed, whereby a reflection of the emitted light at the road sign is reduced, and
    a light intensity detection device for detecting light intensities in the image,
    wherein the analyzing device is configured to locate dominant radiation sources at points in the image when respective light intensities of radiation sources at the points are higher than at other points in the image, wherein the analyzing device is configured to classify the radiation sources located in the image with respect to the reflection of the emitted light based at least in part on information received from a high-beam assistance system relating to oncoming vehicles.

9. The lighting apparatus according to claim 8, further comprising a road sign detection device for detecting road signs in the surroundings of the vehicle, wherein the road sign detection device is configured to determine whether the road sign is present in the surroundings of the vehicle.

10. The lighting apparatus according to claim 8, wherein the analyzing device configured to detect, as a function of at least one of the classification of the radiation sources, the road sign detection, or the road sign information, an area of the lighting device in which a brightness of the emitted light is to be changed.

11. The lighting apparatus according to claim 10, wherein the brightness of the emitted light is reduced such that an intensity of the emitted light is below a threshold value.

12. A motor vehicle comprising a lighting apparatus comprising:

a lighting device for emitting light for illuminating surroundings of the vehicle, an acquisition device for acquiring an image of the surroundings of the vehicle, an analyzing device for determining whether a road sign is present in the surroundings of the vehicle, wherein the analyzing device is configured to detect a position of the road sign in the surroundings of the vehicle by analyzing the image, a control device for controlling the lighting device of the vehicle, wherein the control device is configured to control the lighting device such that light emitted by the lighting device in a direction of the detected position of the road sign is changed, whereby a reflection of the emitted light at the road sign is reduced, and a light intensity detection device for detecting light intensities in the image, wherein the analyzing device is configured to locate dominant radiation sources at points in the image when respective light intensities of radiation sources at the points are higher than at other points in the image, and wherein the analyzing device is configured to classify the radiation sources located in the image with respect to the reflection of the emitted light based at least in part on information received from a high-beam assistance system relating to oncoming vehicles.

* * * * *